United States Patent
Tran

(10) Patent No.: US 12,190,116 B2
(45) Date of Patent: *Jan. 7, 2025

(54) MICROPROCESSOR WITH TIME COUNT BASED INSTRUCTION EXECUTION AND REPLAY

(71) Applicant: Simplex Micro, Inc., San Jose, CA (US)

(72) Inventor: Thang Minh Tran, Tustin, CA (US)

(73) Assignee: Simplex Micro, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/713,569

(22) Filed: Apr. 5, 2022

(65) Prior Publication Data

US 2023/0315474 A1 Oct. 5, 2023

(51) Int. Cl.
*G06F 9/38* (2018.01)

(52) U.S. Cl.
CPC .......... *G06F 9/3838* (2013.01); *G06F 9/3818* (2013.01); *G06F 9/3824* (2013.01); *G06F 9/3826* (2013.01); *G06F 9/3836* (2013.01); *G06F 9/3858* (2023.08)

(58) Field of Classification Search
CPC .... G06F 9/3836; G06F 9/3838; G06F 9/3824; G06F 9/3857; G06F 9/00–3897; G06F 15/00–825; G06F 9/3826
See application file for complete search history.

(56) References Cited

U.S. PATENT DOCUMENTS

| | | | |
|---|---|---|---|
| 5,021,985 | A | 6/1991 | Hu et al. |
| 5,185,868 | A | 2/1993 | Tran |
| 5,187,796 | A | 2/1993 | Wang et al. |
| 5,251,306 | A | 10/1993 | Tran |

(Continued)

FOREIGN PATENT DOCUMENTS

| | | |
|---|---|---|
| EP | 0840213 A2 | 5/1998 |
| EP | 0902360 A2 | 3/1999 |

(Continued)

OTHER PUBLICATIONS

Choi, W., Park, SJ., Dubois, M. (2009). Accurate Instruction Pre-scheduling in Dynamically Scheduled Processors. In: Stenstrom, P. (eds) Transactions on High-Performance Embedded Architectures and Compilers I. Lecture Notes in Computer Science, vol. 5470 Springer, Berlin, Heidelberg. pp. 107-127. (Year: 2009).

(Continued)

*Primary Examiner* — Keith E Vicary
(74) *Attorney, Agent, or Firm* — Appleton Luff

(57) ABSTRACT

A processor includes a time counter and a time-resource matrix and provides a method for statically dispatching instructions if the resources are available based on data stored in the time-resource matrix, and wherein execution times for the instructions use a time count from the time counter to specify when the instructions may be provided to an execution pipeline. The execution times are based on fixed latency times of instructions with exception of the load instruction which is based on the data cache hit latency time.

(Continued)

A data cache miss causes the load instruction and subsequent dependent instructions to be statically replayed at a later time using the same time count.

23 Claims, 5 Drawing Sheets

(56) References Cited

U.S. PATENT DOCUMENTS

| | | | |
|---|---|---|---|
| 5,497,467 A | 3/1996 | Wakui et al. | |
| 5,655,096 A | 8/1997 | Branigin | |
| 5,689,653 A | 11/1997 | Karp et al. | |
| 5,699,536 A * | 12/1997 | Hopkins | G06F 9/3836 |
| | | | 712/216 |
| 5,799,163 A | 8/1998 | Park et al. | |
| 5,802,386 A * | 9/1998 | Kahle | G06F 9/3836 |
| | | | 712/217 |
| 5,809,268 A * | 9/1998 | Chan | G06F 9/3857 |
| | | | 712/E9.049 |
| 5,835,745 A | 11/1998 | Sager et al. | |
| 5,860,018 A * | 1/1999 | Panwar | G06F 9/3863 |
| | | | 712/23 |
| 5,881,302 A | 3/1999 | Omata | |
| 5,903,779 A | 5/1999 | Park | |
| 5,903,919 A | 5/1999 | Myers | |
| 5,958,041 A * | 9/1999 | Petolino, Jr. | G06F 9/30043 |
| | | | 712/214 |
| 5,961,630 A * | 10/1999 | Zaidi | G06F 9/384 |
| | | | 712/214 |
| 5,964,867 A | 10/1999 | Anderson et al. | |
| 5,996,061 A | 11/1999 | Lopez-Aguado et al. | |
| 5,996,064 A * | 11/1999 | Zaidi | G06F 9/3855 |
| | | | 712/216 |
| 6,016,540 A * | 1/2000 | Zaidi | G06F 9/384 |
| | | | 712/216 |
| 6,035,393 A | 3/2000 | Glew et al. | |
| 6,065,105 A * | 5/2000 | Zaidi | G06F 9/3836 |
| | | | 712/23 |
| 6,247,113 B1 | 6/2001 | Jaggar | |
| 6,282,634 B1 | 8/2001 | Hinds et al. | |
| 6,304,955 B1 * | 10/2001 | Arora | G06F 9/3836 |
| | | | 712/216 |
| 6,425,090 B1 * | 7/2002 | Arimilli | G06F 9/3824 |
| | | | 712/E9.046 |
| 6,453,424 B1 * | 9/2002 | Janniello | G06F 9/3855 |
| | | | 713/400 |
| 7,069,425 B1 * | 6/2006 | Takahashi | G06F 9/3857 |
| | | | 712/E9.032 |
| 7,434,032 B1 | 10/2008 | Coon et al. | |
| 8,166,281 B2 | 4/2012 | Gschwind et al. | |
| 9,256,428 B2 * | 2/2016 | Heil | G06F 9/3836 |
| 10,339,095 B2 | 7/2019 | Moudgill et al. | |
| 11,062,200 B2 | 7/2021 | Lie et al. | |
| 11,132,199 B1 | 9/2021 | Tran | |
| 11,144,319 B1 | 10/2021 | Battle et al. | |
| 11,163,582 B1 | 11/2021 | Tran | |
| 11,204,770 B2 | 12/2021 | Tran | |
| 11,263,013 B2 | 3/2022 | Tran | |
| 11,467,841 B1 | 10/2022 | Tran | |
| 11,829,187 B2 * | 11/2023 | Tran | G06F 9/3869 |
| 11,829,762 B2 * | 11/2023 | Tran | G06F 9/5038 |
| 11,829,767 B2 * | 11/2023 | Tran | G06F 1/14 |
| 11,954,491 B2 * | 4/2024 | Tran | G06F 9/3838 |
| 12,001,848 B2 * | 6/2024 | Tran | G06F 9/3869 |
| 12,061,906 B2 | 8/2024 | Stephens et al. | |
| 2001/0004755 A1 | 11/2001 | Levy et al. | |
| 2003/0023646 A1 | 1/2003 | Lin et al. | |
| 2003/0135712 A1 * | 7/2003 | Theis | G06F 9/30156 |
| | | | 712/214 |
| 2004/0073779 A1 | 4/2004 | Hokenek et al. | |
| 2004/0236920 A1 | 11/2004 | Sheaffer | |
| 2005/0251657 A1 | 11/2005 | Boucher | |
| 2006/0010305 A1 | 1/2006 | Maeda et al. | |
| 2006/0095732 A1 | 5/2006 | Tran et al. | |
| 2006/0218124 A1 * | 9/2006 | Williamson | G06F 9/3838 |
| 2006/0259800 A1 | 11/2006 | Maejima | |
| 2006/0288194 A1 * | 12/2006 | Lewis | G06F 9/3869 |
| | | | 712/220 |
| 2007/0038984 A1 | 2/2007 | Gschwind et al. | |
| 2007/0255903 A1 | 11/2007 | Tsadik et al. | |
| 2007/0260856 A1 | 11/2007 | Tran et al. | |
| 2009/0158279 A1 | 6/2009 | Iino et al. | |
| 2011/0099354 A1 | 4/2011 | Takashima et al. | |
| 2011/0153987 A1 | 6/2011 | Luke et al. | |
| 2011/0320765 A1 | 12/2011 | Karkhanis et al. | |
| 2012/0047352 A1 | 2/2012 | Yamana | |
| 2012/0060015 A1 | 3/2012 | Eichenberger et al. | |
| 2012/0151156 A1 | 6/2012 | Citron et al. | |
| 2013/0151816 A1 | 6/2013 | Indukuru et al. | |
| 2013/0297912 A1 | 11/2013 | Tran et al. | |
| 2013/0346985 A1 | 12/2013 | Nightingale | |
| 2014/0059328 A1 | 2/2014 | Gonion | |
| 2014/0082626 A1 | 3/2014 | Busaba et al. | |
| 2015/0026435 A1 | 1/2015 | Muff et al. | |
| 2015/0100754 A1 | 4/2015 | Reid et al. | |
| 2015/0212972 A1 | 7/2015 | Boettcher et al. | |
| 2015/0227369 A1 | 8/2015 | Gonion | |
| 2016/0092238 A1 | 3/2016 | Codrescu et al. | |
| 2016/0275043 A1 | 9/2016 | Grochowski et al. | |
| 2016/0283240 A1 | 9/2016 | Mishra et al. | |
| 2016/0371091 A1 * | 12/2016 | Brownscheidle | G06F 9/3855 |
| 2017/0177345 A1 | 6/2017 | Ould-Ahmed-Vall et al. | |
| 2017/0177354 A1 | 6/2017 | Ould-Ahmed-Vall | |
| 2017/0357513 A1 * | 12/2017 | Ayub | G06F 9/3891 |
| 2017/0371657 A1 | 12/2017 | Mahurin et al. | |
| 2018/0181400 A1 | 6/2018 | Scherbinin et al. | |
| 2018/0196678 A1 * | 7/2018 | Thompto | G06F 9/3855 |
| 2018/0253310 A1 | 9/2018 | Stephens | |
| 2019/0079764 A1 | 3/2019 | Diamond et al. | |
| 2019/0243646 A1 | 8/2019 | Anderson | |
| 2020/0004534 A1 | 1/2020 | Gurram et al. | |
| 2020/0004543 A1 | 1/2020 | Kumar et al. | |
| 2020/0319885 A1 | 10/2020 | Eyole et al. | |
| 2020/0387382 A1 | 12/2020 | Tseng et al. | |
| 2021/0026639 A1 * | 1/2021 | Tekmen | G06F 9/3869 |
| 2021/0311743 A1 | 10/2021 | Tran | |
| 2021/0326141 A1 | 10/2021 | Tran | |
| 2021/0389979 A1 | 12/2021 | Tran | |
| 2022/0066760 A1 | 3/2022 | Chang et al. | |
| 2023/0068637 A1 | 3/2023 | Feiste et al. | |
| 2023/0244490 A1 | 8/2023 | Tran | |
| 2023/0244491 A1 | 8/2023 | Tran | |
| 2023/0367599 A1 | 11/2023 | Waterman et al. | |

FOREIGN PATENT DOCUMENTS

| | | |
|---|---|---|
| EP | 0959575 A1 | 11/1999 |
| WO | 0010076 A1 | 2/2000 |
| WO | 0208894 A1 | 1/2002 |
| WO | 0213005 A1 | 2/2002 |

OTHER PUBLICATIONS

Diavastos, Andreas & Carlson, Trevor. (2021). Efficient Instruction Scheduling using Real-time Load Delay Tracking. (Year: 2021).

J. S. Hu, N. Vijaykrishnan and M. J. Irwin, "Exploring Wakeup-Free Instruction Scheduling," 10th International Symposium on High Performance Computer Architecture (HPCA'04), Madrid, Spain, pp. 232-232 (Year: 2004).

Written Opinion of the International Searching Authority, PCT/S2022/052185.

Written Opinion of the International Searching Authority, PCT/US2023/018970.

Written Opinion of the International Searching Authority, PCT/US2023/018996.

PCT/US23/27497: Written Opinion of the International Searching Authority.

PCT/US2023/018996, Written Opinion of the International Preliminary Examining Authority, Apr. 8, 2024.

(56) References Cited

OTHER PUBLICATIONS

PCTUS2023081682, Written Opinion of the International Searching Authority, Mar. 22, 2024.
Written Opinion of The International Preliminary Examining Authority, PCTUS2023/018970, Mar. 25, 2024.
PCT/US2023/018996, International Preliminary Report on Patentability, Jul. 19, 2024.
PCT/US2023/018970, International Preliminary Report on Patentability, Jul. 18, 2024.
Anonymous: "RISC-V—Wikipedia", Apr. 16, 2022 (Apr. 16, 2022), XP093142703, Retrieved from the Internet: URL:https://en.wikipedia.org/w/index.php?title=RISC-V&oldid=1083030760 [retrieved on Sep. 9, 2024].

* cited by examiner

MICROPROCESSOR WITH TIME COUNT BASED INSTRUCTION EXECUTION AND REPLAY

RELATED APPLICATIONS

This application is related to U.S. patent application Ser. No. 17/588,315, filed Jan. 30, 2022, and entitled "Microprocessor with Time Counter for Statically Dispatching Instructions," which application is hereby incorporated by reference in its entirety, and which application is assigned to the assignee of the present application.

BACKGROUND

Technical Field

The present invention relates to the field of computer processors. More particularly, it relates to issuing and executing instructions based on a time count in a processor where the processor consists of a general-purpose microprocessor, a digital-signal processor, a single instruction multiple data processor, a vector processor, a graphics processor, or other type of microprocessor which executes instructions.

Technical Background

Processors have become increasingly complex chasing small increments in performance at the expense of power consumption and semiconductor chip area. The approach in out-of-order (OOO) superscalar microprocessors has remained basically the same for the last 25-30 years, with much of the power dissipation arising from the dynamic scheduling of instructions for execution from the reservation stations or central windows. Designing an OOO superscalar microprocessor is a huge undertaking. Hundreds of instructions are issued to the execution pipeline where the data dependencies are resolved and arbitrated for execution by a large number of functional units. The result data from the functional units are again arbitrated for the write buses to write back to the register file. If the data cannot be written back to the register file, then the result data are kept in temporary registers and a complicated stalling procedure is performed for the execution pipeline.

An alternative to OOO superscalar processors is very-long-instruction-word (VLIW) processors. These have diminished interest in the industry because of the need for a complex compiler and relatively weak performance.

The latency of a processor's load instruction is often the determining factor in performance due to the high frequency of load instructions and that is it has the longest latency in the instruction set. Typically, the load instruction has priority in the execution pipeline of the microprocessor. Load dependent instructions also typically have priority for execution as soon as the load data are available. The load latency time is a function of data cache hit rate. Typically, load dependent instructions are speculatively scheduled for execution based on the expected load latency time. If the load data is not in the data cache (data cache miss), then the speculative scheduled instruction must be replayed. The replay can be selective for the dependent load instructions or can be for all instructions after the load with data cache miss. The latter case is simpler in implementation but with lower performance. The former case, i.e., selective replay, adds much more complexity to the dynamic scheduling of a traditional OOO superscalar microprocessor.

Thus, there is a need for a speculative execution microprocessor, including an OOO superscalar microprocessor, which consumes less power, has a simpler design, employs a simple mechanism for replaying of instructions, and is scalable with consistently high performance.

SUMMARY

The disclosed embodiments provide a processor with a time counter and a method for statically dispatching instructions to an execution pipeline with preset execution times based on a time count from the counter. A source operand that is determined to be no longer valid may be retained in the execution queue for replay.

A disclosed approach to microprocessor design employs static scheduling of instructions. A disclosed static scheduling algorithm is based on the assumption that a new instruction has a perfect view of all previous instructions in the execution pipeline, and thus it can be scheduled for execution at an exact time in the future, e.g., with reference to a time count from a counter. Assuming an instruction has 2 source operands and 1 destination operand, the instruction can be executed out-of-order when conditions are met of (1) no data dependency, (2) availability of read buses to read data from the register file, (3) availability of a functional unit to execute the instruction, and (4) availability of a write bus to write result data back to the register file.

All the above requirements are associated with time: (1) a time when all data dependencies are resolved, (2) at which time the read buses are available to read source operands from a register file, (3) at which subsequent time the functional unit is available to execute the instruction, and (4) at which further subsequent time the write bus is available to write result data back to the register file.

In one embodiment a time counter increments periodically, for example, every clock cycle, and the resulting count is used to statically schedule instruction execution. Instructions have known throughput and latency times, and thus can be scheduled for execution based on the time count. For example, an add instruction with throughput and latency time of 1 can be scheduled to execute when any data dependency is resolved. If the time count is 5 and the add has no data dependency at time 8, then the available read buses are scheduled to read data from the register file at time 8, the available arithmetic logic unit (ALU) is scheduled to execute the add instruction at time 9, and the available write bus is scheduled to write result data from ALU to the register file at time 10. The read buses, the ALUs, and the write buses are the resources represented in a time-resource matrix in which the number of available resources is decremented at the usage times. The latency time of the load instructions is based on the data cache hit latency. The data cache hit rate is typically about 80-90% meaning that the write back times of some load instructions are different than the preset latency time. In another embodiment, the latency time for accessing level-2 (L2) cache memory is used to update the write back time of the load instruction. In addition, multiple load instructions can have data bank conflict by accessing the same data cache data bank. The data cache is often implemented with static-random access memory (SRAM) array which allows single access per clock cycle. The data bank conflict adds extra clock cycles to the load latency time. If the load data are delayed, then the exact delay time is known by L2 cache latency or by using the data bank delay time.

In one embodiment, a register scoreboard is used to keep track of the write back time of destination registers for all instructions including the load instruction. If the write back time is delayed, then the register scoreboard is updated with a new write back time. When the instruction is dispatched from the execution queue to the functional unit, the register scoreboard is read again. If the write-back time is delayed, dispatch logic determines that a source operand will not be valid. The dispatch logic causes the instruction to remain in the execution queue and to be replayed at a later time based on the new write-back time.

In one embodiment a processor includes a time counter which stores a time count incremented every clock cycle representing a current time of the processor, a time-resource matrix to indicate what resources are available at every time count, an instruction issue unit for receiving a first instruction and issuing the first instruction with a preset execution time based on the time count and the availability of the needed resources, and an execution queue for receiving the first instruction from the instruction unit and dispatching the first instruction to a functional unit when the preset execution time is the same as the time count. Since the preset time of an instruction can be modified because of the change in load delay time, the entry for the first instruction in the execution queue remains valid until the preset time can be confirmed or modified with the new preset time.

BRIEF DESCRIPTION OF THE DRAWINGS

Aspects of the present invention are best understood from the following description when read with the accompanying figures.

DETAILED DESCRIPTION

Figure 1:
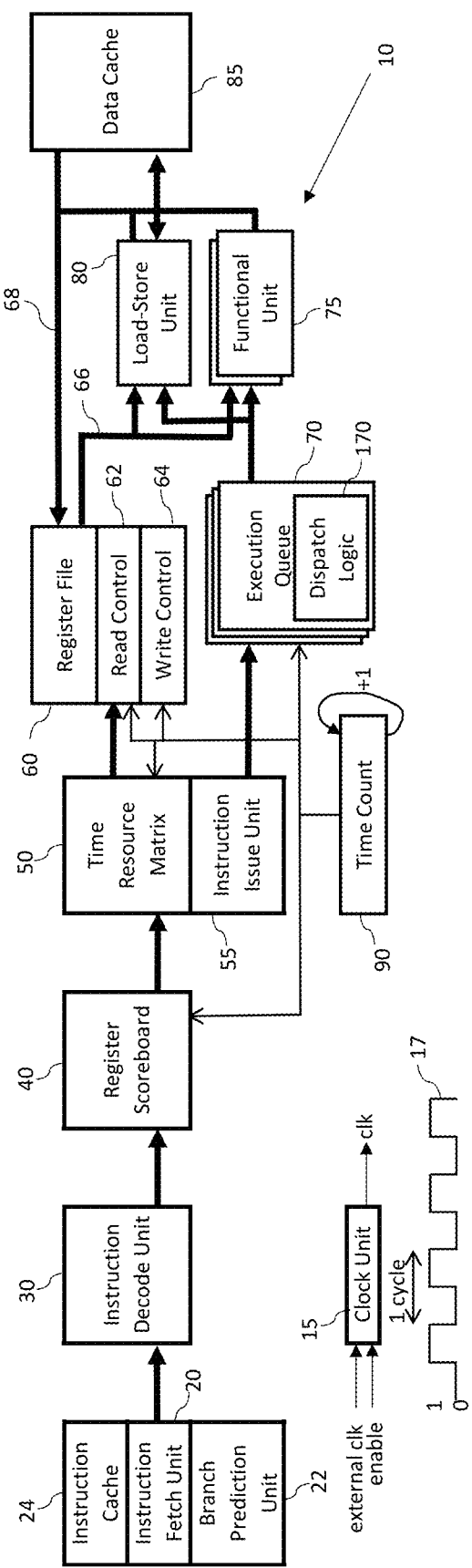
FIG. 1 is a block diagram illustrating a processor based data processing system in accordance with present invention.

The following description provides different embodiments for implementing aspects of the present invention. Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

In one embodiment a processor is provided, typically implemented as a microprocessor, that schedules instructions to be executed at a preset time based on a time count from a time counter. In such a microprocessor the instructions are scheduled to be executed using the known throughput and latency of each instruction to be executed. For example, in one embodiment, the ALU instructions have throughput and latency times of 1, the multiply instructions have throughput time of 1 and the latency time of 2, the load instructions have the throughput time of 1 and latency time of 3 (based on a data cache hit), and the divide instruction have throughput and latency times of 32.

FIG. 1 is a block diagram of a microprocessor based data processing system. The exemplary system includes a microprocessor 10 having a clock unit 15, an instruction fetch unit 20, an instruction cache 24, a branch prediction unit 22, an instruction decode unit 30, a register scoreboard 40, a time-resource matrix 50, an instruction issue unit 55, a register file 60, a read control unit 62, a write control unit 64, a plurality of execution queues 70, a plurality of functional units 75, a load-store unit 80, and a data cache 85. Dispatch logic 170 associated with execution queue 70 is described in further detail in connection with FIG. 5 and supports replay of instructions when a source operand is delayed. The microprocessor 10 includes a plurality of read buses 66 from the register files to the functional units 75 and load-store unit 80. The system also includes a plurality of write buses 68 to write result data from the functional unit 75, the load-store unit 80, and the data cache 85 to the register file 60. The microprocessor 10 is a synchronous microprocessor where the clock unit 15 generates a clock signal ("clk") which couples to all the units in the microprocessor 10. The clock unit 15 provides a continuously toggling logic signal 17 which toggles between 0 and 1 repeatedly at a clock frequency. Clock output signal ("clk") of clock unit 15 enables synchronizing many different units and states in the microprocessor 10. The clock signal is used to sequence data and instructions through the units that perform the various computations in the microprocessor 10. The clock unit 15 may include an external clock as an input to synchronize the microprocessor 10 with external units (not shown). The clock unit 15 may further include an enable signal to disable the clock unit when the microprocessor is in idle stage or not use for instruction execution.

According to an embodiment the microprocessor 10 also includes a time counter unit 90 which stores a time count incremented, in one embodiment, every clock cycle. The time counter unit 90 is coupled to the clock unit 15 and uses "clk" signal to increment the time count.

In one embodiment the time count represents the time in clock cycles when an instruction in the instruction issue unit 55 is scheduled for execution. For example, if the current time count is 5 and an instruction is scheduled to be executed in 22 cycles, then the instruction is sent to the execution queue 70 with the execution time count of 27. When the time count increments to 26, the execution queue 70 issues the instruction to the functional unit 75 for execution in next cycle (time count 27). The time counter unit 90 is coupled to the register scoreboard 40, the time-resource matrix 50, the read control 62, the write control 64, and the plurality of execution queues 70. The scoreboard 40 resolves data dependencies in the instructions. The time-resource matrix 50 checks availability of the various resources which in one embodiment include the read buses 66, the functional units 75, the load-store unit 80, and the write buses 68. The read control unit 62, the write control unit 64, and the execution queues 70 receive the corresponding scheduled times from the instruction issue unit 55. The read control unit 62 is set to read the source operands from the register file 60 on specific read buses 66 at a preset time. The write control unit 64 writes the result data from a functional unit 75 or the load-store unit 80 or the data cache 85 to the register file 60 on a specific write bus 68 at a preset time discussed below. The execution queue 70 is set to dispatch an instruction to a functional unit 75 or the load-store unit 80 at a preset time. In each case, the preset time is the time setup by the instruction decode unit 30. The preset time is a future time based on the time count, so when the time count counts up to the future preset time, then the specified action will happen, where the specified action is reading data from the register file 60, writing data to the register file 60, or issuing an instruction to a functional unit 75 for execution. The instruction issue unit 55 determines that the instruction is free of any data dependency and the resources are available to set the "preset times" for the instruction to be executed in the execution pipeline.

In the microprocessor system 10 the instruction fetch unit 20 fetches the next instruction(s) from the instruction cache 24 to send to the instruction decode unit 30. One or more instructions can be fetched per clock cycle from the instruction fetch unit 20 depending on the configuration of microprocessor 10. For higher performance, an embodiment of microprocessor 10 fetches more instructions per clock cycle for the instruction decode unit 30. For low-power and embedded applications, an embodiment of microprocessor 10 might fetch only a single instruction per clock cycle for the instruction decode unit 30. If the instructions are not in the instruction cache 24 (commonly referred to as an instruction cache miss), then the instruction fetch unit 20 sends a request to external memory (not shown) to fetch the required instructions. The external memory may consist of hierarchical memory subsystems, for example, an L2 cache, an L3 cache, read-only memory (ROM), dynamic random-access memory (DRAM), flash memory, or a disk drive. The external memory is accessible by both the instruction cache 24 and the data cache 85. The instruction fetch unit 20 is also coupled with the branch prediction unit 22 for prediction of the next instruction address when the branch is detected and predicted by the branch prediction unit 22. The instruction fetch unit 20, the instruction cache 24, and the branch prediction unit 22 are described here for completeness of a microprocessor 10. In other embodiments, other instruction fetch and branch prediction methods can be used to supply instructions to the instruction decode unit 30 for microprocessor 10.

The instruction decode unit 30 is coupled to the instruction fetch unit 20 for new instructions, and also coupled to the register scoreboard 40. The instruction decode unit 30 decodes the instructions to determine instruction type, instruction throughput and latency times, and the register operands.

The register operands, as an example, may consist of 2 source operands and 1 destination operand. The operands are referenced to registers in the register file 60. The source and destination registers are used here to represent the source and destination operands of the instruction. The source registers support solving read-after-write (RAW) data dependencies. If a later instruction has the same source register as the destination register of an earlier instruction, then the later instruction has RAW data dependency. The later instruction must wait for completion of the earlier instruction before it can start execution. The register scoreboard 40 is used to keep track of the completion time of the destination registers of the earlier instructions and hence keep a time entry for each destination register for all pending instructions in the execution pipeline. In the preferred embodiment the completion time is maintained in reference to the time count 90.

Each of the units shown in the block diagram of FIG. 1 can be implemented in integrated circuit form by one of ordinary skill in the art in view of the present disclosure. With regard to one embodiment of this invention, time counter 90 is a basic N-bit wrap-around counter incrementing by 1 every clock cycle. The time-resource matrix 50 is preferably implemented as registers with entries read and written as with a conventional register structure.

The integrated circuitry employed to implement the units shown in the block diagram of FIG. 1 may be expressed in various forms including as a netlist which takes the form of a listing of the electronic components in a circuit and the list of nodes that each component is connected to. Such a netlist may be provided via an article of manufacture as described below.

In other embodiments, the units shown in the block diagrams of the various figures can be implemented as software representations, for example in a hardware description language (such as for example Verilog) that describes the functions performed by the units described herein at a Register Transfer Level (RTL) type description. The software representations can be implemented employing computer-executable instructions, such as those included in program modules and/or code segments, being executed in a computing system on a target real or virtual processor. Generally, program modules and code segments include routines, programs, libraries, objects, classes, components, data structures, etc. that perform particular tasks or implement particular abstract data types. The program modules and/or code segments may be obtained from another computer system, such as via the Internet, by downloading the program modules from the other computer system for execution on one or more different computer systems. The functionality of the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a non-transitory computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The aforementioned implementations of software executed on a general-purpose, or special purpose, computing system may take the form of a computer-implemented method for implementing a microprocessor, and also as a computer program product for implementing a microprocessor, where the computer program product is stored on a non-transitory computer readable storage medium and includes instructions for causing the computer system to execute a method. The aforementioned program modules and/or code segments may be executed on suitable computing system to perform the functions disclosed herein. Such a computing system will typically include one or more processing units, memory and non-transitory storage to execute computer-executable instructions.

Figure 2:
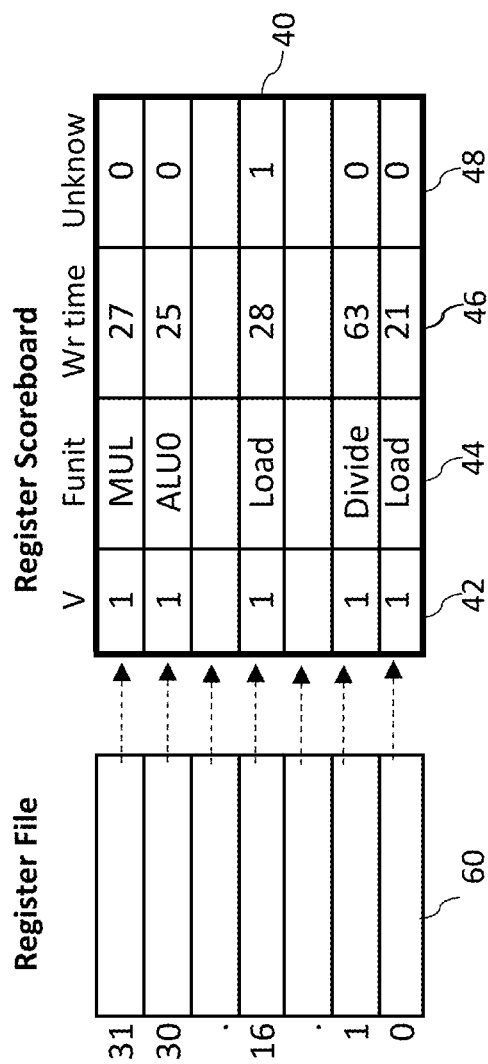
FIG. 2 is a block diagram illustrating a register file and a register scoreboard.

FIG. 2 illustrates the register file 60 and the register scoreboard 40. In one embodiment, the register file 60 has 32 registers, numbered as registers 0 to 31 as illustrated. Each register in the register file 60 has a corresponding entry in the register scoreboard 40. The register scoreboard 40 stores the pending write status for the registers 60. A valid bit field 42 indicates a valid write back to the register file 60 at a future time in reference to the time count 90, as specified by the write time field 46 from a specific functional unit in the "Funit" field 44 unless the unknown field 48 is set. As examples illustrated in FIG. 2, register 0 is written back at time count 21 from the load-store unit 80. Register 1 is written back at time count 63 from the divide unit (one of the functional units 75). Register 30 is written back at time count 25 from the ALU0 (another of the functional units 75), etc. as illustrated in FIG. 2. Register 16 has the unknown bit set indicating that the load data from the load-store unit 80 have an unknown write-back time. The write time 46 is the time in reference to the time count 90 when the result data is written to the register file 60. The data is not available from the register file 60 until the next clock cycle, but the result data can be forwarded from the functional unit in the "Funit" field 44 in the register scoreboard 40. For example, if the value of the time count 90 is 19, then the load-store unit 80 produces the result data in 2 clock cycles for writing back to the register 0 of the register file 60 at time count 21. When the load instruction is issued, the write time is based on the data cache hit time to set the write time 46 of the register scoreboard 40. The load data may be delayed which will cause the write time 46 of the register scoreboard 40 to be modified based on the delay time. In an example, the write time 46 of the load may be modified based on the latency of L2 cache (not shown, outside of the processor 10). The load data can be further delayed because of a L2 cache miss and the delay time may be unknown, in which case the unknown field 48 of the register scoreboard 40 is set. A subsequent instruction with RAW data dependency on the destination register of the load instruction is rescheduled (or replayed) as the write time for the destination register changes. The mechanism to replay instructions will be detailed later in the description of the execution queue 70.

The write time of a destination register is the read time for the subsequent instruction with RAW data dependency on the same destination register. Referring back to FIG. 1, the source registers of an instruction in the instruction decode unit 30 access the register scoreboard 40 for the read times. If the valid bit 42 of a source register is not set in the register scoreboard 40, then the data is in the register file 60 and can be accessed at any time providing availability of the read buses 66, else the write time 46 is the earliest time to issue the instruction.

An instruction reads source operand data at read time, executes the instruction with a functional unit 75 at execute time, and writes the result data back to the register file 60 at write time. The write time is recorded in the write time field 46 of the register scoreboard 40. With 2 source registers, the instruction selects the later write time from the register scoreboard 40 as the read time for the instruction. The execute time is the read time plus 1 time count where the functional unit 75 or the load-store unit 80 starts executing the instruction. The write time of the instruction is the read time plus the instruction latency time. If the instruction latency time is 1 (e.g., an ALU instruction), then the write time and execution time of the instruction are the same.

Each instruction has an execution latency time. For example, the add instruction has a latency time of 1, the multiply instruction has a latency time of 2, and the load instruction has a latency time of 4 assuming a data cache hit. In another example, if the current time count is 5 and the source registers of an add instruction receive write time counts of 22 and 24 from the register scoreboard 40, then the read time count is set at 24. In this case, the execution and the write time counts are both 25 for the add instruction. As shown in FIG. 1, the register scoreboard 40 is coupled to the time-resource matrix 50 where the read, execute, and write phases of an instruction access the time-resource matrix 50 for availabilities of the resources.

Figure 3:
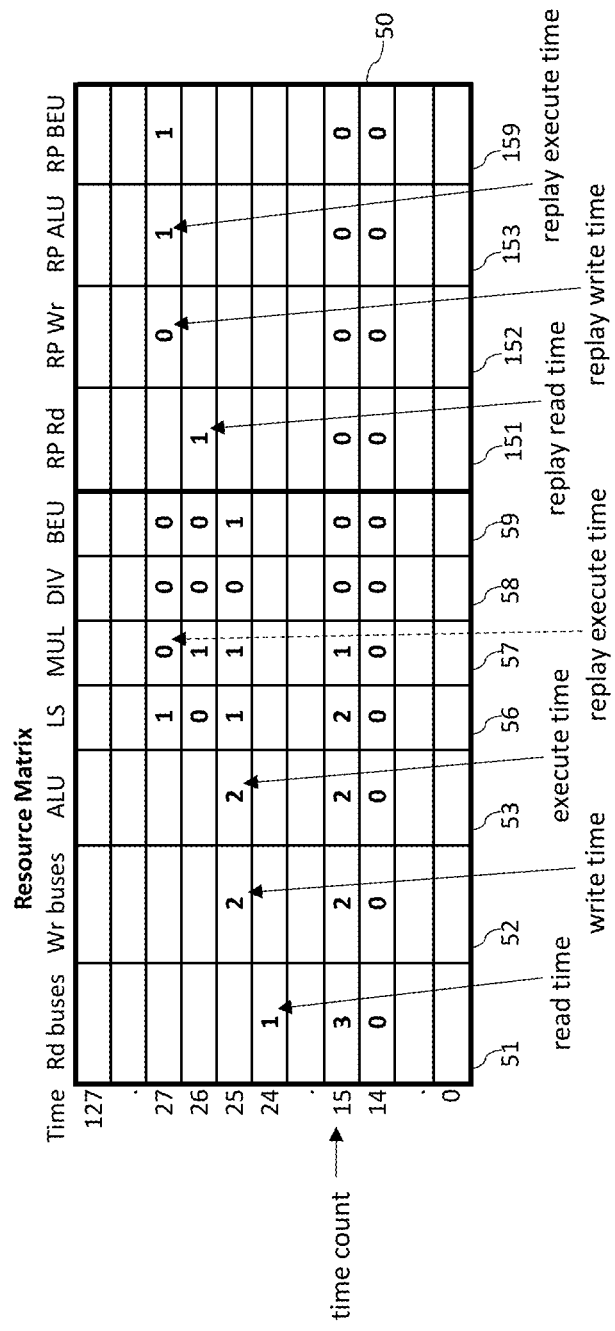
FIG. 3 is a block diagram illustrating a time-resource matrix.

FIG. 3 illustrates the time-resource matrix 50. The time-resource matrix 50 preferably includes the same number of time entries as the time counter 90. For example, if the time counter 90 returns to zero after 128 cycles, then the time-resource matrix 50 preferably has 128 entries. The time counter is incremented every clock cycle and rotates back from the 127th entry to the 0th entry. The columns in the time-resource matrix 50 represent the availability of specific resources. In the embodiment shown in FIG. 3 the time-resource matrix 50 is arranged to identify the availability of resources by identifying the resources that are busy, and specifically the read buses 51, the write buses 52, the ALUs 53, the load-store ports 56, the multiply unit 57, the divide unit 58, the branch execution unit (BEU) 59, the replay read buses 151, the replay write buses 152, the replay ALUs 153, and the replay BEU 159. These resources are an example, and if other functional units are provided by microprocessor 10 those are also included in the resource matrix 50.

The read buses column 51 corresponds to the plurality of read buses 66 in FIG. 1. The write buses column 52 corresponds to the plurality of write buses 68 in FIG. 1. The ALUs column 53, the multiply column 57, the divide column 58, and the branch execution unit column 59 correspond to the plurality of functional units 75 of FIG. 1. The load-store ports column 56 corresponds to the load-store unit 80 of FIG. 1. The load instructions are issued from the instruction issue unit 55 with the expectation of data being in the data cache 85 (i.e., a data cache hit). In one embodiment, when the data is not present in the data cache 85, then the load instruction changes the write time in the register scoreboard 40 for the latency time of an L2 cache. The instructions that are dependent on the destination register of the replay load instruction are also replayed. The same procedure is used for replaying instructions where the new replay read time, replay execute time, and replay write time are determined based upon a check of the time-resource matrix 50 for availability of resources. The replay instructions are statically scheduled for execution with the same procedure as issued instructions. In one embodiment, second sets of read buses, write buses, ALUs, and BEU are used as replay read buses 151, replay write buses 152, replay ALUs 153, and replay BEU 159, respectively, for replay instructions to avoid conflict with the issued instructions. In one embodiment, the replay read buses 151 is part of the plurality of read buses 66 in FIG. 1, the replay write buses 152 is part of the plurality of write buses 68 in FIG. 1, and the replay ALUs 153 and replay BEU 159 are part of the plurality of functional units 75 of FIG. 1. The load-store ports 56, multiply unit 57, and divide unit 58 are shared between the issue and replay instructions. In another embodiment, the read buses 51, the write buses 52, the ALUs 53, and the BEU 59 are shared by both the issue and replay instructions.

FIG. 3 also shows an example of the information in the time-resource matrix 50. Shown is data with a read time count of 24, an execution time count of 25, and a write time count of 25. When an instruction accesses the time-resource matrix 50 for availability of resources, the matrix 50 shows that at read time 24, 1 read bus is busy, at execution time 25, 2 ALUs, 1 load-store port, 1 multiply unit, and 1 BEU are taken for execution of previous instructions, and at write time 25, 2 write buses are busy. In one embodiment, the numbers of read buses, write buses, ALUs, load-store ports, multiply unit, divide unit, and BEU are 4, 4, 3, 2, 1, 1, and 1, respectively. If an add instruction with 2 source registers and 1 destination register is issued with read time of 24, execution time of 25, and write time of 25, then the number of read buses 51 at time 24, write buses 52 at time 25, and ALUs 53 at time 25 are incremented to 3, 3, and 3, respectively. The read bus 51 indicates that 1 read bus is busy, so the next 2 read buses 1 and 2 (in-order) are assigned to the source registers of the add instruction. The ALU unit 53 indicates that 2 ALUs are busy, so the next in-order ALU 2 is assigned as functional unit for execution of the add instruction. The write bus 52 indicates that 2 write buses are busy, so the next in-order write bus 2 is assigned to write back data from ALU 2 to the register file 60. The resources are in-order assigned to the instructions as with the replay resources. The source registers of the add instruction will receive data from read buses 1 and 2, ALU 2 is used for execution of the add instruction, and write bus 2 is used to write back data from ALU 2. The counts in the row are reset by the time count. As illustrated in FIG. 3, when the time count is incremented from 14 to 15, all resource counts of row 14 are reset. All resource counts of row 15 are reset when the count is incremented to 16 in next cycle. If an issued instruction is a multiply instruction with execution time of 25, since there is only one multiply unit 57, the issued instruction cannot be issued for execution time of 25. In another embodiment, two read times, two execution times, and two write times are used per instruction with expectation that one set of times is free of conflict, increasing the chance for instruction issuing. In another embodiment, the counts indicate the number of available resources. The resource counts are decremented if the resource is assigned to an issue instruction.

FIG. 3 also shows another example of replaying an instruction in the time-resource matrix 50, which will occur in the event of a cache miss. Shown is data for an add instruction with a replay read time count of 26, a replay execution time count of 27, and a replay write time count of 27. In most cases, one source operand is read from register file 60 and one source operand of an instruction is replayed. The replay add instruction would need 1 read bus, 1 ALU, and 1 write bus to replay the add instruction at a specific time. The time-resource matrix 50 shows 1 read bus, no write bus, and 1 ALU are busy at the set time for the add instruction so the second read bus, the first write bus, and the second ALU are assigned to the replay add instruction. Since the read buses, write buses, ALUs, and BEU are frequently used, the implementation is simpler by duplicating these resources. The shared resources such as the load/store load-store ports, multiply unit, and divide unit are more expensive in chip area to copy.

In one embodiment, each resource represented in the time-resource matrix 50 is implemented as an independent register file where the number of entries is the same as the time counter 90, and each entry consists of a resource count. The issue or replay instruction accesses individual resources as needed, instead of accessing all resources in the time-resource matrix.

The availability of all resources for the required times are read by the instruction issue unit 55 from the time-resource matrix 50 and sent to the instruction issue unit 55 for a decision of when to issue an instruction to the execution queue 70. If the resources are available at the required times, then the instruction can be scheduled and sent to the execution queue 70. The issued instruction updates the register scoreboard 40 with the write time and updates the time-resource matrix 50 to reduce the available resource values. All resources must be available at the required time counts for the instruction to be dispatched to the execution queue 70. If all resources are not available, then the required time counts for the instruction in question are incremented by one, and the time-resource matrix 50 is checked as soon as the same cycle or next cycle. The particular number of read buses 66, write buses 68, and functional units 75 in FIG. 1 is preferably chosen to minimize stalling of instructions in the instruction issue unit 55.

Figure 4:
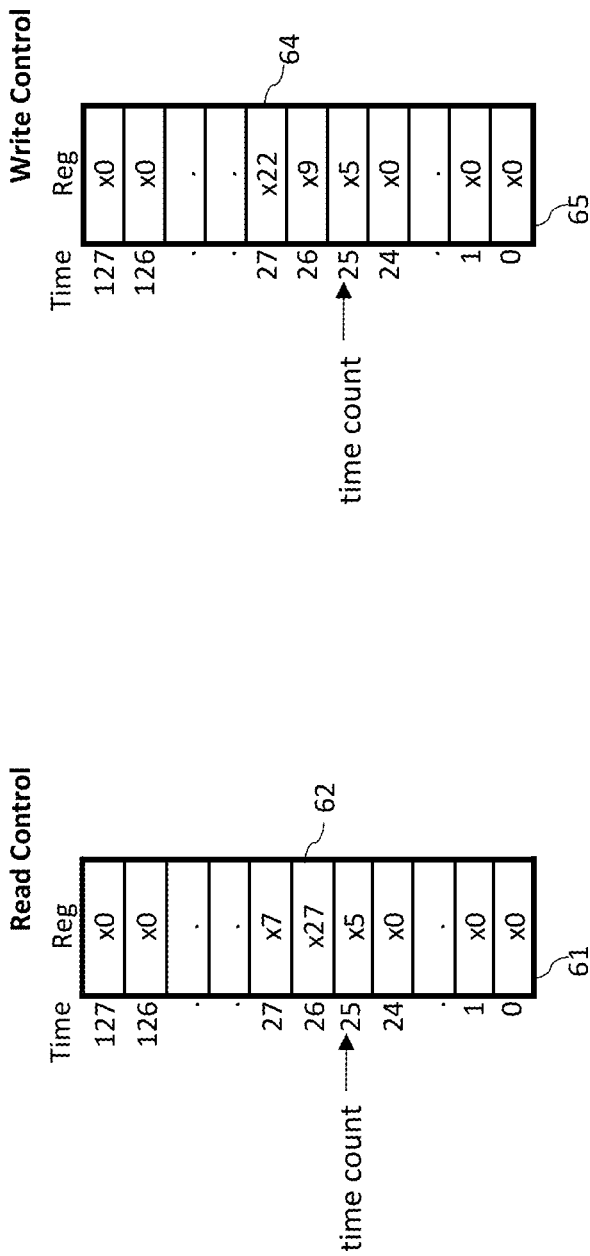
FIGS. 4A and 4B are block diagrams illustrating a read bus control and a write bus control.

FIG. 4A illustrates operation of a single read bus by the read control unit 62 and FIG. 4B operation of a single write bus by the write control unit 64. The read control unit 62 and the write control unit 64 include a number of time entries to match the time counter 90. As mentioned above, in a preferred embodiment the time count is incremented every clock cycle. The columns in the read control unit 62 represent the source register 61. The column in the write control unit 64 represents the destination registers for the write bus 65. In one embodiment, microprocessor 10 uses the RISC-V instruction set architecture. In that architecture, register 0 (x0) is not a real register; reading of register x0 returns 0 and writing to register x0 is ignored. The x0 register is used as an invalid read and write to the register file 60. If a different instruction set architecture is used, then the read control unit 62 and the write control unit 64 can include another column of valid bits (not shown) to indicate a valid read or write, respectively. As illustrated in FIGS. 4A and 4B, when the time count is incremented from 25 to 26, the register fields 61 and 65 of row 25 will be reset to x0 to indicate that those resources have been freed up. The register fields 61 and 65 of row 26 are reset to x0 when the count is incremented to 27 in the next cycle. FIGS. 4A and 4B show operation of a single read bus 66 and a single write bus 68, respectively. If, however, 4 read buses and 3 write buses are implemented, then the functionality of FIGS. 4A and 4B are duplicated 4 times and 3 times, respectively.

In the example illustrated in FIG. 4A, at the time count of 25 the register x5 from the register field 61 of the read control 62 is used to read the entry 5 from the register scoreboard 40 for the valid bit 42, the "Funit" 44, and the write time 46. If the valid bit 42 is set and the write time 46 is equal to the time count 90, then the data is forwarded from the "Funit" 44 instead of reading from the register file 60. If the valid bit 42 is reset, then the data is read from the register file 60. If the valid bit 42 is set and the write time 46 is greater than the time count 90, then the instruction is replayed where the write time 46 is the read time for the replay instruction. The replay instruction will access the time-resource matrix 50 to reissue the instruction to the replay execution queue. In the next cycle, when the time count is 26, the register x27 from the register field 61 is used to read from the register file 60. The read control unit 62 is responsible for supplying the source operand data on a specific one of the read buses 66. The execution queue 70 keeps the information of which one of the read buses 66 is to receive source operand data. The execution queues 70 and read control unit 62 are synchronized based on the time-resource matrix 50. The read control unit 62 provides centralized control for the read buses 66, thus reducing complexity from the hundreds of instructions in dynamic scheduling. Similarly in FIG. 4B, the register x5 from the register field 65 of the write control unit 64 at time count of 25 is used to write to the register file 60. The register x5 will also access the "Funit" 44 of the register scoreboard 40 to get the result data from a specific functional unit 75. Again, the execution queues 70, the functional units 75, and the write control unit 64 are synchronized to transfer result data on a write bus 68 to write to the register file 60. The write control unit 64 is the centralized control for the write buses 68 which removes complexity compared to the plurality of functional units in dynamic scheduling.

Figure 5:
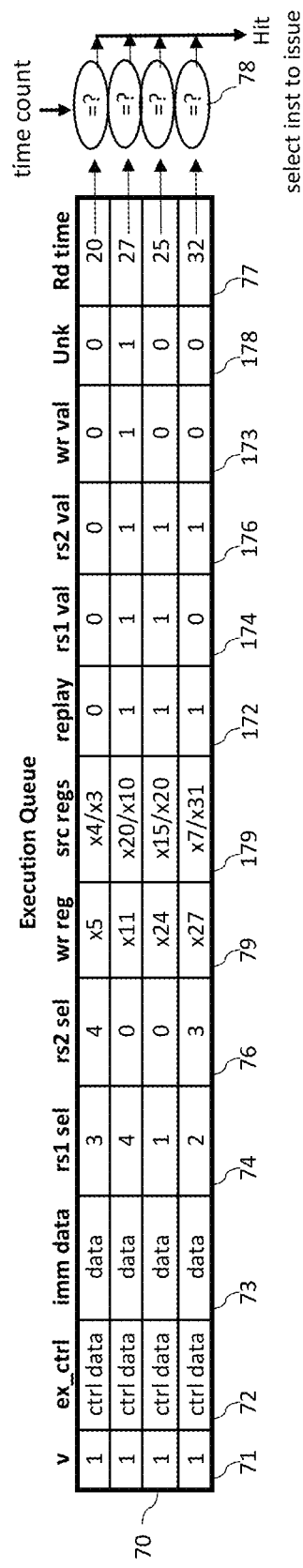
FIG. 5 is a block diagram illustrating an execution queue.

FIG. 5 illustrates an example of a 4-entry execution queue 70. The number of entries for the execution queue 70 is only an illustration. The invention is not limited to any number of execution queue 70 entries and the execution queue 70 could take the form of a single-entry execution queue. Each entry is an instruction waiting for execution by one of the functional units 75 or the load-store unit 80 according to the time count in the read time column 77. Each entry in the execution queue 70 preferably consists of the following fields: valid bit 71, control data 72, immediate data 73, first source register select 74, second source register select 76, read time 77, destination register number 79, source register numbers 179, replay valid 172, first source register valid 174, second source register valid 176, write valid 173, and unknown time 178. The valid bit 71 indicates that the entry is valid in the execution queue 70. The control data 72 specifies the specific operation to be used by the functional units 75 or the load-store unit 80. The immediate data 73 is an alternative to the second source register for the instruction. The valid indication for the immediate data 73 may be included in the control data field 72. Most instructions have an option to use immediate data 73 instead of data from the second source register. The first source register select 74 identifies which one of the read buses 66 has the operand data for the first source register. The second source register select 76 identifies which one of the read buses 66 has the operand data for the second source register. The source register selects 74 and 76 may not be used for some instructions. The destination register number 79 and the source register numbers 179 are referenced to registers in the register file 60. These register numbers are used only for replaying of an instruction.

Note that the destination register can be, but does not need to be, kept with the instruction. The write control unit 64 is responsible for directing the result data from a functional unit 75 to a write bus 68 to write to the register file 60. The execution queues 70 are only responsible for sending instructions to the functional units 75 or the load-store unit 80. The read time field 77 which has the read time of the instruction is synchronized with the read control unit 62. When the read time 77 is the same as the time count 90 as detected by the comparators 78, the instruction is issued to the functional units 75 or the load-store unit 80. For the example in FIG. 5, the entries are issued to the functional units out-of-order. The read time field 77 indicates that the fourth entry is issued at time count 20, the second entry is issued at time count 25, the third entry is issued at time count 27, and the first entry is issued at time count 32.

FIG. 5 shows four examples of instruction types in an execution queue 70. The fourth entry (shown as the top row) is normal dispatching of an instruction to a functional unit 75 at read time 20, and the first source operand data is from fourth read bus 66 as indicated by the first source register select 74 and the second source operand data is from fifth read bus 66 as indicated by the first source register select 76. In one embodiment, the control data 72 includes identification of a functional unit 75 for dispatching of the instruction. The control data 72 and immediate data 73 are dispatched to the functional unit. The valid bit 71 is reset at time 20 from the read time 77 when the instruction is dispatched to the functional unit 75. The other fields (172, 174, 176, 173, 178) of the fourth entry are not used as the instruction is not replayed.

In an embodiment, the steps for executing an instruction from the instruction decode unit 30 of the microprocessor 10 are: (1) decoding the instructions in instruction decode unit 30 for operand registers, instruction type, latency and throughput times, (2) accessing the register scoreboard 40 for RAW data dependency in which the worst case write time 46 of the register scoreboard 40 is the read time of the instruction and the execution and write times are calculated, (3) accessing the time-resource matrix 50 for availability of the read port(s), the functional unit, and write port based on the read, execution, and write times to set the read port control 62, write port control 64, and to dispatch an instruction to an execution queue 70, (4) the execution queue 70 dispatches an instruction to a functional unit 75, and the read port control 62 accesses the register file 60 to read source operand data and the register scoreboard 40 to confirm data from the register file 60 or to forward data from a functional unit 75 or to replay the instruction where all information is processed by the dispatch logic 170 to determine if the instruction is to be replayed, (5) if the instruction is not replayed, then it is executed in one functional unit 75 or load-store unit 80 and produced result data at the expected write time, (6) the write port control 64 accesses the register scoreboard 40 to ensure that the write time 46 has not been delayed, resets the valid bit 42 of the destination register, and uses the functional unit 44 to write the result data from the functional unit 75 or the load-store unit 80 to the register file 60. If the result data is not written by the load-store unit 80 at the expected write time to the register file 60, then the load data can be delayed by data cache miss or data bank conflict. In this example, the instruction can be replayed in step (4) as determined by the dispatch logic 170 of the execution queue 70 or step (6) and the entry in the execution queue 70 remains valid and sets replay bit 172 along with many other bits in the execution queue 70 as shown in FIG. 5.

The first entry of FIG. 5 (shown as the bottom row) illustrates replaying of an instruction in accordance with the above step (4) where the write time 46 in the register scoreboard 40 is greater than the time count 90 for the first source register. The read port control 62 accesses the source register information from the register scoreboard 40 and sends to the dispatch logic 170 for determining if the instruction is replayed. In this example, the second source operand data are valid but the first source operand data are not valid. The second source register valid bit 176 is set and the second source operand data are written into immediate data field 73. The replay instruction needs to fetch only the first source operand data for execution. The write time 46 in the register scoreboard 40 for the first source register is used as the new read time to replay the instruction. The write times 46 of the register scoreboard 40 for both source registers can be greater than the time count 90 and the read time for replaying instruction is based on the longest write time 46. The dispatch logic 170 also calculates the execution and write times based on the latency time of the instruction from the read time and are used to access the replay read buses 151, the replay write bus 152, and a functional unit replay resource 153 or 159 or a shared functional unit resource 56, or 57, or 58 of the time-resource matrix 50. If the resources are available, then the new read time is written into the read time 77. Note that the read time entry of the read port control 62 is written with the source register(s) and the write time entry of the write port control 64 is written with the destination register which is from the write register 79 of the execution queue 70. If at least one resource is not available, then the unknown bit 48 in the register scoreboard 40 is set for the destination register 79 and the unknown bit 178 in the execution queue 70 is set to cause the instruction to be replayed by the retire order of instruction. In another embodiment, two read times, two execution times, and two write times are used per replay instruction with the expectation that one set of times is free of conflict, increasing the chance for instruction issuing. In another embodiment, the re-order buffer (not shown) in processor 10 is used to track the order of instructions as they are issued from the instruction decode unit 30 to retire the instructions in-order after the instructions are out-of-order executed. The re-order buffer is coupled with the execution queues 70 to indicate that the unknown entry is the next instruction to be retired in-order. Note that the control data field 72 of an execution queue 70 includes the re-order buffer entry to synch with the re-order buffer retire entry. At the retire order, the unknown entry of execution queue 70 continuously accesses the time-resource matrix 50 for available resources until the unknown entry can be dispatched to functional unit 75 in the next cycle. The execution queues 70 must keep the source and destination register numbers in the write register field 79 and source registers field 179 in order to access the register file 60 and the register scoreboard 40.

In one embodiment, an execution queue 70 dispatches instructions to multiple functional units 75 at the same time. For example, an execution queue 70 may be coupled to multiple ALU functional units 75. The time-resource matrix 50 assigns the ALU functional units in-order to the issue instructions. Similarly, the time-resource matrix 50 assigns the replay ALU functional units in-order to the replay instructions. The time-resource matrix 50 keeps the issue and replay ALU functional units separate to avoid conflict between the issue and replay instructions. The issue and replay ALU functional units may be numbered continuously such as 0-3 for 4 issue ALUs and 4-5 for 2 replay ALUs. The execution queue 70 does not distinguish the ALU type and can dispatches 6 instructions to 6 ALU functional units.

The second entry of FIG. 5 illustrates replaying of a load instruction in accordance with the above step (6) where the load data delay is detected and does not write load data back to the register file 60 at the expected write time. As an example, the data cache miss is not known at the time the load instruction is dispatched from execution queue 70 to the load-store unit 80. The second entry remains valid until the cycle where the data cache hit or miss is determined at which time the valid bit 71 of the second entry can be reset or remain set for replaying. It is important for the entry in the execution queue 70 to remain valid until the load is completed as the execution queue full signal stalls the next load or store instructions in the instruction issue unit 55 of the processor 10. The L2 cache latency time updates the write time 46 in the register scoreboard 40 for the destination register and the read time 77 of the second entry of the execution unit 70. Both first and second source register valid bits 174 and 176 are set to indicate that this load instruction (second entry of the execution queue 70) is waiting for the load data. When the read time 77 of the second entry matches the time count 90, the load data from L2 cache should be valid and is written back to the register file 60, and the valid bit 42 of the register scoreboard 40 and the valid bit 71 of the second entry of the execution queue 70 are reset. The L2 cache can be a cache miss and not return data at the expected time, in which case the unknown bit 178 of the execution queue 70 and the unknown bit 48 of the register scoreboard 40 for the destination register are set. This case is illustrated in the third entry of FIG. 5. The data cache miss is only one example of a load data delay. As examples, other load data delays can arise from a data bank conflict when more than one load data requests are to the same bank and an ECC 1-bit correctible error delay, as well as a combination of multiple load data delays.

The third entry of FIG. 5 illustrates replaying of a load instruction with unknown time. The external memory (not shown) outside of the processor 10 returns load data at some later time, writes into the immediate data field 73, and write valid bit 173 of the third entry of the execution queue 70 is set. At the retire order, if the write valid bit 173 is not valid, then the third entry must wait until the write valid bit 173 is set. If the write valid bit 173 is set, then the unknown entry continuously accesses the time-resource matrix 50 for available write buses 52 and replay write buses 152 until the immediate data 73 can be written to the register file 60 with the destination register in the write register 79 in the next cycle. Since no issue or replay instruction uses the write buses resources of the time-resource matrix 50 in the next clock cycle, in this example the third entry of the execution queue 70 can use any available write bus resource in the next cycle without any conflict. Along with writing data back to the register file 60, the valid bit 42 in the register scoreboard 40 and the valid bit 71 of the third entry of the execution queue 70 are reset.

In an embodiment, each functional unit 75 has its own execution queue 70. In another embodiment, an execution queue 70 dispatches instructions to multiple functional units 75. In this case, another field (not shown) can be added to the execution queue 70 to indicate the functional unit number for dispatching of instructions.

Referring back to FIG. 1, the execution queues 70 are coupled to the load-store unit (LSU) 80 and the functional units 75. The execution queues 70 issue the instructions to the functional units 75 or the load-store unit 80 when the read times 77 are the same as the time count 90. If the instruction is a load-store, then it is dispatched to the LSU 80, else it is dispatched to one of the functional units 75. The LSU 80 and functional units 75 are also coupled to the read buses 66 and write buses 68 to access the register file 60. The source operand data are fetched from register file 60 and transported on read buses 66 to the LSU 80 and functional units 75. The result data from the LSU 80 and functional units 75 are transported on write buses 68 to write to destination registers in the register file 60. The LSU 80 is also coupled to the data cache 85. The LSU 80 executes the load and store instructions to read and write data from the data cache 85. If the data are not in the data cache 85, then the cache miss causes that cache line to be fetched from external memory (not shown). Typically, the functional units 75 perform different operations, e.g., ALU, multiply, divide, branch, etc. In other embodiments, the functional units 75 perform the same function, for example, multiple ALUs. Furthermore, the invention is not limited to integer functional units. In other embodiments the functional units include floating point units, digital-signal processing units, vector processing units, or custom designed units.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention.

Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

What is claimed is:

1. A processor implemented in an integrated circuit, the processor comprising:
a hardware time counter storing a time count representing a current time of the processor, wherein the time count is incremented with each clock cycle of a clock circuit;
an instruction issue unit that is coupled to the hardware time counter to receive the time count, the instruction issue unit receiving a first instruction, and issuing the first instruction with a preset first execution time based on the time count;
an execution queue that is coupled to the hardware time counter to receive the time count, and that is coupled to the instruction issue unit to receive the first instruction, the execution queue providing the first instruction to a functional unit when the preset first execution time corresponds to the time count; and
dispatch logic that responds to a determination that an operand stored in a source register of the first instruction is not valid by retaining the first instruction in the execution queue and replaying the first instruction.

2. The processor of claim 1 wherein:
the hardware time counter is an N-bit counter which increments the time count from a zero count value to an N-bit count value, where the instruction issue unit may issue an instruction at each time count, and wherein the N-bit counter returns to the zero count value after reaching the N-bit count value.

3. The processor of claim 2 further comprising:
a register scoreboard storing a write time of a register in a register file, wherein the write time is a future time of the time count;
an instruction decode unit coupled to the register scoreboard, wherein the instruction decode unit reads at least one write time for source operands of the first instruction from the register scoreboard, and uses the at least one write time to determine the preset first execution time for the first instruction;
a time-resource matrix unit comprising a plurality of time-resource registers that store information relating to available resources for a corresponding time count of the N-bit counter;
wherein the available resources comprise at least one of a plurality of read buses, at least one of a plurality of write buses, at least one of a plurality of one or more types of functional units, at least one of a plurality of replay read buses, and at least one of a plurality of replay write buses; and
wherein the execution queue checks the time-resource matrix unit for availability of the replay read buses, the replay write buses, and the functional units to cause a first replay of the first instruction at a preset second execution time.

4. The processor of claim 3, wherein the available resources further comprise a shared resource and wherein the time-resource matrix unit stores and modifies information relating to the shared resource, wherein the information relating to the shared resource is accessed from the time-resource matrix by the instruction issue unit, or upon replay of the first instruction.

5. The processor of claim 3 wherein the execution queue comprises a plurality of entries, each of the entries containing an instruction and wherein each instruction of the execution queue is associated with a corresponding replay bit, a corresponding unknown bit and a first read time and wherein update of the first read time of a particular instruction in the execution queue with a new read time for the particular instruction in the execution queue that represents a future time count for the particular instruction in the execution queue causes setting of a replay bit associated with the particular instruction in the execution queue;
wherein the execution queue provides instructions to at least one functional unit; and
wherein replay of the particular instruction in the execution queue causes access of the time-resource matrix unit for available resources wherein if at least one resource is not available at the first read time for the particular instruction, an unknown bit of the particular instruction in the execution queue is set.

6. The processor of claim 5 wherein
the execution queue stores for the particular instruction a corresponding immediate data field and a corresponding source valid bit; and
for the particular instruction, the execution queue sets the corresponding source valid bit and the corresponding replay bit upon writing of valid source operand data into the immediate data field that corresponds to the particular instruction.

7. The processor of claim 5 wherein the execution queue:
replays instructions in accordance with a retire order; and
sets an unknown bit for a second instruction in the execution queue to cause replay of the second instruction in accordance with the retire order.

8. The processor of claim 5 wherein the execution queue:
responds to load data associated with a load instruction in the execution queue being delayed by setting source register valid bits and a replay bit associated with the load instruction;
updates a second read time of the load instruction based on an estimated latency time and the time count;
causes writing of the load data upon return of the load data at the second read time of the load instruction to the register file; and
sets the corresponding unknown bit associated with the load instruction if the load data does not return at the second read time of the load instruction.

9. The processor of claim 1 further comprising:
a read control unit having a plurality of read control registers, each register of the plurality of read control registers storing a time count entry specifying when a corresponding operand is scheduled to be read and transported on a read bus;
wherein each time count entry of the read control registers contains a corresponding read address of a first particular register in a register file, wherein each read address is referenced relative to the time count; and
wherein the read control unit accesses a register scoreboard to determine a scheduled write time of a first register in the register file, wherein if the scheduled write time of the first register is the same as the time count then data is forwarded from the functional unit instead of being read from the register file.

10. The processor of claim 9 further comprising:
a write control unit having a plurality of write control registers, each register of the plurality of write control registers storing a time count entry specifying when result data corresponding to the time count entry of the write control register is scheduled to be transported on a write bus and written to a second register of the register file;

wherein each time count entry of the write control registers contains a corresponding write address of a second particular register in the register file, wherein each write address is referenced relative to the time count; and wherein the write control unit accesses the register scoreboard to clear a valid bit if a write time associated with one of the write control registers is the same as the time count.

11. The processor of claim 10 wherein the execution queue stores a plurality of instructions and provides each instruction of the plurality of instructions to a corresponding functional unit, wherein each instruction of the plurality of instructions is associated with a corresponding read time which is represented by a corresponding future time count.

12. The processor of claim 11 wherein the read control unit is synchronized with a read time in the execution queue.

13. A processor implemented in an integrated circuit, the processor comprising:
   a clock circuit;
   a hardware time counter storing a time count representing a specific time of operation of the processor, wherein the time count is incremented by the clock circuit;
   a time-resource matrix that stores information relating to available resources for each time count of the hardware time counter;
   an instruction issue unit that receives a first instruction, and based on availability of the available resources as provided by the time-resource matrix issues or stalls the first instruction, wherein the first instruction has associated therewith a preset first execution time;
   an execution queue that is coupled to the hardware time counter to receive the time count, and that is coupled to the instruction issue unit to receive the first instruction from the instruction issue unit, and provide the first instruction to a functional unit when the preset first execution time matches the time count;
   dispatch logic that retains the first instruction in the execution queue and replays the first instruction in response to determining that an operand in at least a source register of the first instruction is not valid;
   a register scoreboard storing a write time of a register in a register file, wherein the write time is a future time specified by the time count; and
   an instruction decode unit that is coupled to the register scoreboard and that reads write times for source operands of a selected instruction from the register scoreboard, and uses the write times to determine an execution time for the selected instruction; and
   wherein the available resources comprise a plurality of one or more of read buses, write buses, and functional units.

14. A computer program product for issuing an instruction, the computer program product stored on a non-transitory computer readable storage medium and including instructions for causing a computer system to execute a method that is executable by a processor, the method comprising:
   scheduling the instruction to execute at a first future time depending on availability of resources specified in a time-resource matrix, wherein the first future time corresponds to a time count provided by a time counter that is incremented with each clock cycle of a clock circuit;
   issuing the instruction to an execution queue or stalling execution of the instruction in an instruction issue unit; and
   replaying the instruction at a second future time in response to determining that at least one of the resources is not available at the first future time.

15. The computer program product of claim 14 wherein the method further comprises:
   incrementing the time counter with each cycle of the clock circuit to an N-bit count value, wherein the time counter returns to a zero count value after reaching the N-bit count value.

16. The computer program product of claim 15 wherein the method further comprises:
   storing a write time of a first register of a register file wherein the write time is a third future time specified by the time count.

17. The computer program product of claim 16 wherein the method further comprises:
   storing information corresponding to available resources for each time count in the time-resource matrix, wherein the resources comprise a plurality of one or more of read buses, write buses, and functional units.

18. The computer program product of claim 17 wherein the method further comprises:
   associating with a register of a read control unit a first read time that specifies when data is scheduled to be read from the register file and transported on a read bus, of the read buses, specified by the read control unit to be available at the first read time count.

19. The computer program product of claim 18 wherein the method further comprises:
   associating with a register of a write control unit a write time that specifies when result data is scheduled to be transported on a write bus and written to a second register of the register file.

20. The computer program product of claim 19 wherein the method further comprises:
   storing a plurality of instructions in the execution queue, wherein each of the plurality of instructions in the execution queue is associated with a corresponding read time specified by the time count.

21. The computer program product of claim 20 wherein the method further comprises:
   synchronizing the corresponding read time of associated with each of the plurality of instructions in the execution queue with the read control unit.

22. The computer program product of claim 21 wherein the method further comprises:
   causing the execution queue to provide a third instruction to a functional unit;
   replaying the third instruction at a fourth future time, if at least one resource specified for the third instruction in the time-resource matrix is not available, by accessing the time-resource matrix for availability of resources and replaying the third instruction in accordance with a retire order if at least one resource required by the third instruction is not available at the fourth future time.

23. The computer program product of claim 22 wherein the method further comprises:
   dispatching a load instruction, that specifies load data, in the execution queue to a load-store unit;

if loading of the load data specified by the load instruction is delayed then replaying of the load instruction at a fifth future time based on an estimated latency time and the time count; and completing the load instruction when the load data returns in accordance with the estimated latency time and if the load data does not return at the fifth future time in accordance with the estimated latency time then executing the load instruction in the execution queue in accordance with the retire order.

* * * * *